US006934227B2

(12) United States Patent
Nakata et al.

(10) Patent No.: US 6,934,227 B2
(45) Date of Patent: Aug. 23, 2005

(54) OPTICAL DISK DEVICE, SEMICONDUCTOR INTEGRATED CIRCUIT, PICKUP CONTROL METHOD AND VIBRATION COMPONENT DETECTION METHOD

(75) Inventors: Yasuo Nakata, Osaka (JP); Masanori Harui, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 423 days.

(21) Appl. No.: 10/231,160

(22) Filed: Aug. 30, 2002

(65) Prior Publication Data

US 2003/0043706 A1 Mar. 6, 2003

(30) Foreign Application Priority Data

Sep. 6, 2001 (JP) ....................................... 2001-270114

(51) Int. Cl.[7] ................................................. G11B 7/00

(52) U.S. Cl. ............................... 369/44.32; 369/44.29; 369/44.35

(58) Field of Search .......................... 369/44.25, 44.27, 369/44.28, 44.29, 44.32, 44.35, 47.18, 47.36, 47.44, 53.14, 53.18, 53.19, 53.28

(56) References Cited

U.S. PATENT DOCUMENTS 5,357,496 A * 10/1994 Ikeda et al. .............. 369/44.29
6,256,275 B1 7/2001 Eguchi et al.
6,714,493 B1 * 3/2004 Kishimoto et al. ...... 369/44.38
6,738,327 B2 * 5/2004 Tateishi et al. .......... 369/47.26

FOREIGN PATENT DOCUMENTS

JP 09-044862 A 2/1997
JP 11-175984 A 7/1999
JP 11-328830 A 11/1999
JP 2001134958 A * 5/2001 ............ G11B/7/09
JP 2002-298389 A 10/2002

* cited by examiner

*Primary Examiner*—Thang V. Tran
*Assistant Examiner*—Bach Vuong
(74) *Attorney, Agent, or Firm*—McDermott Will & Emery LLP

(57) ABSTRACT

To increase the vibration resistance of an optical disk device with respect to vibrations in the focus direction. More specifically, an optical disk device is provided with a multiplication means for generating a focus vibration component FC from the focus error signal FE, a multiplication means for generating a tracking vibration component TC from the tracking error signal TE, an adder for adding the focus vibration components FC and TC, and a low-pass filter for extracting the vibration component VC from the added results. Thus, the vibration component VC is extracted considering not only vibrations in the tracking direction but also vibrations in the focus direction, so that vibrations acting on the device can be more accurately detected, and vibration resistance is increased.

14 Claims, 4 Drawing Sheets

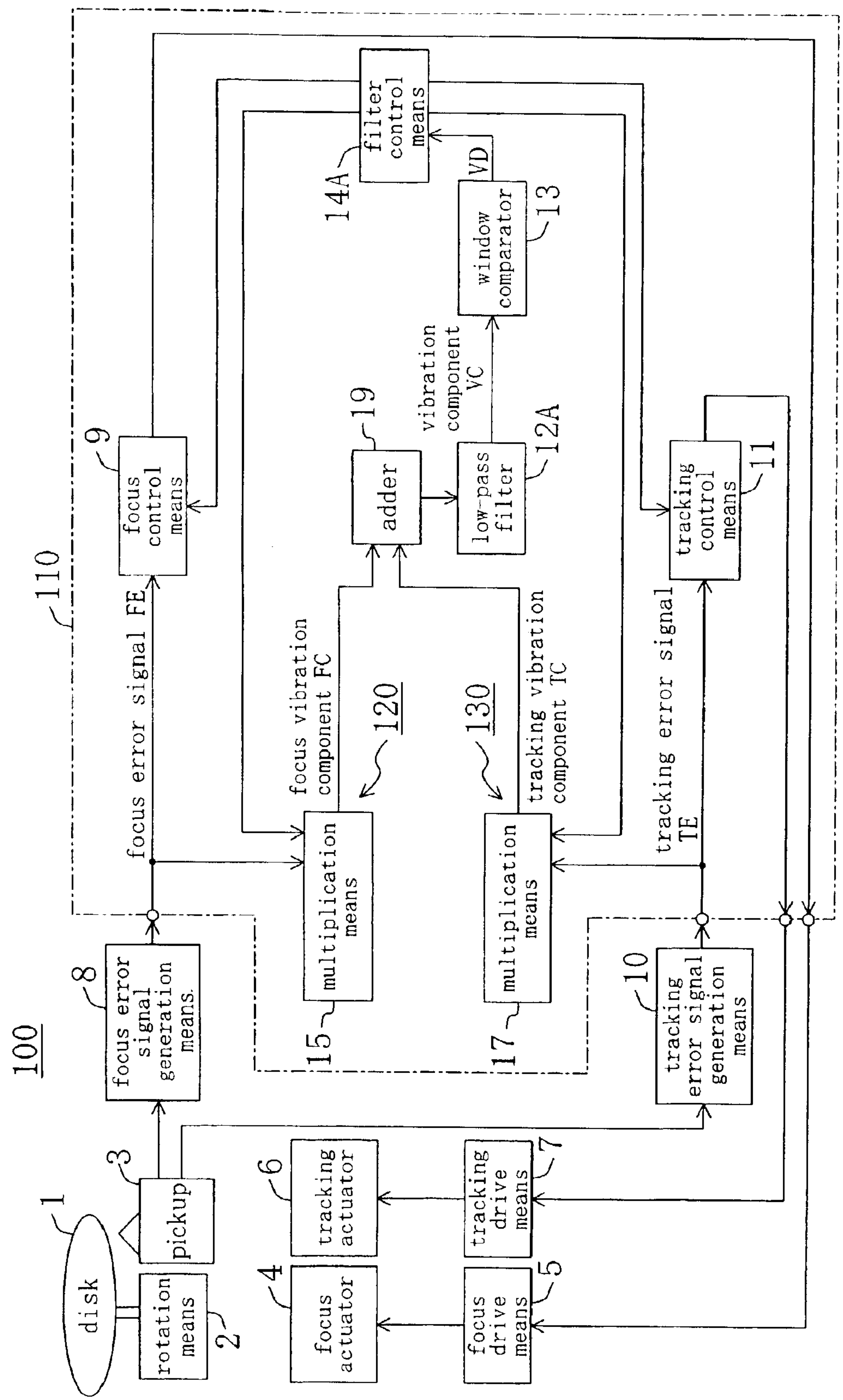
FIG. 1
100
110
disk
1
rotation means
2
pickup
3
focus actuator
4
focus drive means
5
tracking actuator
6
tracking drive means
7
focus error signal generation means.
8
focus control means
9
tracking error signal generation means
10
tracking control means
11
low-pass filter
12A
window comparator
13
filter control means
14A
multiplication means
15
multiplication means
17
adder
19
120
130
focus error signal FE
tracking error signal TE
focus vibration component FC
tracking vibration component TC
vibration component VC
VD

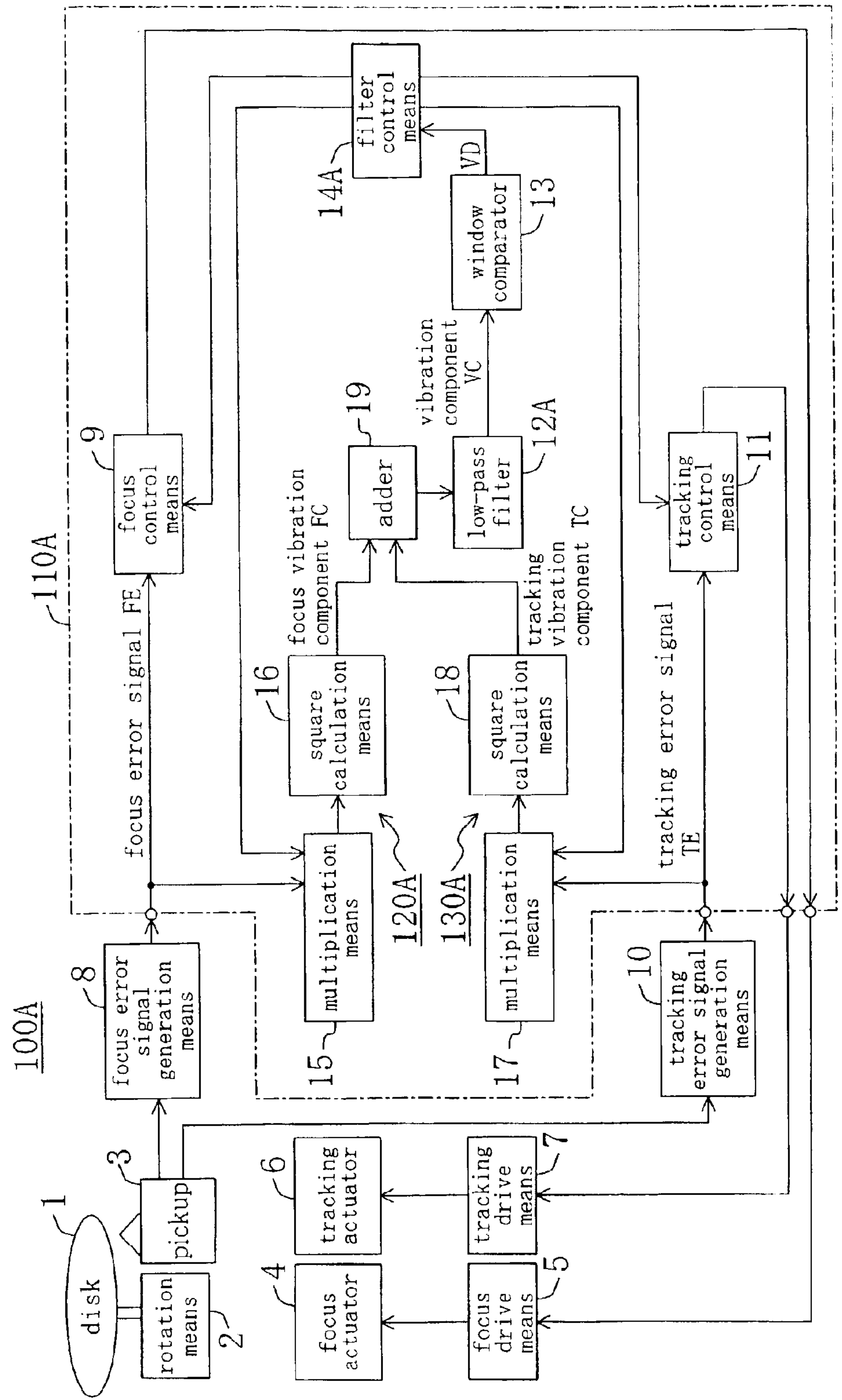
FIG. 2
100A
110A
120A
130A
1
disk
2
rotation means
3
pickup
4
focus actuator
5
focus drive means
6
tracking actuator
7
tracking drive means
8
focus error signal generation means
9
focus control means
10
tracking error signal generation means
11
tracking control means
12A
low-pass filter
13
window comparator
14A
filter control means
15
multiplication means
16
square calculation means
17
multiplication means
18
square calculation means
19
adder
focus error signal FE
tracking error signal TE
focus vibration component FC
tracking vibration component TC
vibration component VC
VD

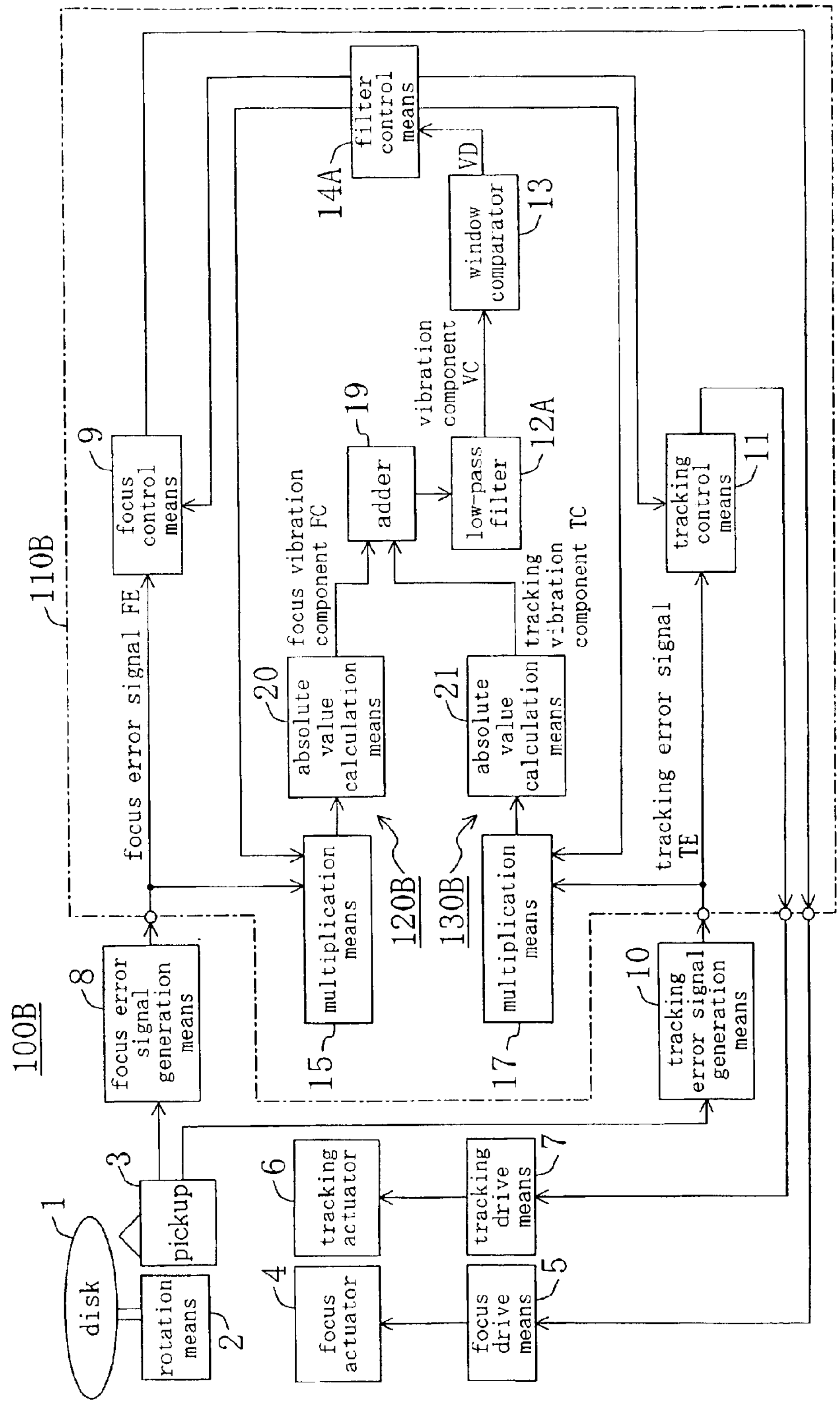
FIG. 3
100B
110B
120B
130B
disk
1
rotation means
2
pickup
3
focus actuator
4
focus drive means
5
tracking actuator
6
tracking drive means
7
focus error signal generation means
8
focus control means
9
tracking error signal generation means
10
tracking control means
11
low-pass filter
12A
window comparator
13
filter control means
14A
multiplication means
15
multiplication means
17
adder
19
absolute value calculation means
20
absolute value calculation means
21
focus error signal FE
tracking error signal TE
focus vibration component FC
tracking vibration component TC
vibration component VC
VD disk
1
rotation means
2
pickup
3
focus actuator
4
focus drive means
5
tracking actuator
6
tracking drive means
7
focus error signal generation means
8
focus error signal FE
focus control means
9
tracking error signal generation means
10
tracking error signal TE
tracking control means
11
bandpass filter
12
vibration component VC
window comparator
13
VD
filter control means
14

OPTICAL DISK DEVICE, SEMICONDUCTOR INTEGRATED CIRCUIT, PICKUP CONTROL METHOD AND VIBRATION COMPONENT DETECTION METHOD

BACKGROUND OF THE INVENTION

The present invention relates to the vibration resistance properties of optical disk devices, and more particularly relates to the technology of preventing the focus and the tracking of the pickup from being displaced by vibrations applied from the outside.

To reproduce a high quality signal in an optical disk device, the laser spot is ideally always kept in perfect focus and precisely on track with respect to the signal recording surface. However, vibrations of a certain size may occur in the focus direction perpendicular to the signal recording surface or in the tracking direction perpendicular to the direction in which the track is advanced, due to factors such as the mechanical precision of the disk rotating mechanism, the planar precision of the disk itself, or external disturbances. For this reason, optical disk devices, in general, are provided with a focus actuator that drives the objective lens of the pickup in the focus direction and a tracking actuator that drives the objective lens in the tracking direction. These actuators apply the focus servo and the tracking servo to the pickup in order to keep the laser spot always in perfect focus and precisely on track even if the above vibrations occur.

FIG. 4 shows the configuration of a conventional optical disk device. The configuration and the above the control of the conventional optical disk device are briefly described below with reference to FIG. 4.

A disk 1 is an optical disk on which information has been recorded in a predetermined track arrangement. A rotation means 2 is a motor for rotating the disk 1. A pickup 3 focuses a laser beam onto the information recording surface of the disk 1 to form a laser spot, and reads the recorded information by detecting the light reflected therefrom and detects relative position errors in the focus direction and relative position errors in the tracking direction with respect to the information recording surface.

A focus actuator 4 is driven by a focus drive means 5, and moves the pickup 3 in the focus direction. Similarly, a tracking actuator 6 is driven by a tracking drive means 7, and moves the pickup 3 in the tracking direction.

A focus error signal generation means 8 generates a focus error signal FE based on the relative position error detected by the pickup 3. Also, a focus control means 9 controls the focus of the pickup 3 based on the focus error signal FE. Similarly, a tracking error signal generation means 10 generates a tracking error signal TE based on the relative position error detected by the pickup 3, and a tracking control means 11 controls the tracking of the pickup 3 based on the tracking error signal TE. Thus, the laser spot is controlled so that it is always in perfect focus and precisely on track.

On the other hand, when optical disk devices are used in portable applications, for example, they are subject to relatively strong vibrations and impacts from external sources. When these vibrations or impacts exceed the tolerance range of the above control, the laser spot can no longer be maintained in the optimal condition. Accordingly, optical disk devices generally utilize the generation of tracking error signal TE that are caused by external vibrations or the like in order to detect the vibration that is acting on the device, and based on this detection, increase the gain of the focus servo and tracking servo so that the servos are not displaced. Servo controls based on this vibration detection are executed by a bandpass filer 12, a window comparator 13, and a filter control means 14 in the optical disk device shown in FIG. 4. Hereinafter, this control is described briefly.

The bandpass filter 12 is set to pass only the signal component of predetermined frequencies in order to obtain signals that are caused by vibrations. Thus, the tracking error signal TE is passed through the bandpass filter 12, so that particular frequency components are extracted therefrom and output as the vibration component VC.

A predetermined threshold level is set in the window comparator 13, and when the vibration component VC that is input exceeds this threshold level, that is, when the vibration exceeds the tolerance range, the window comparator 13 detects that a vibration is acting on the device and outputs a vibration detection signal VD.

The filter control means 14 receives the vibration detection signal VD and as a result increases the gain of the digital filters that are provided in the focus control means 9 and the tracking control means 11, so as to change the filter properties of these digital filters. Thus, the focus servo and the tracking servo are kept from moving easily, and this makes it difficult for a strong vibration from the outside to displace the focus and the tracking of the pickup.

In general, optical disk devices are more sensitive to, and affected by, vibrations in the tracking direction than vibrations in the focus direction. Consequently, like in the conventional optical disk device shown in FIG. 4, by adopting a configuration that increases resistance to vibrations in the tracking direction, the vibration resistance properties of the device can be secured. That is, conventionally, the vibration resistance properties of optical disk devices were ensured without any particular consideration being given to vibration in the focus direction.

However, when optical disk devices are used in portable applications, for example, they are subject to particularly strong vibrations and impacts in the focus direction. In conventional optical disk devices, this disrupted the focus servo and in the worst cases even displaced the servo.

Additionally, it is expected that future increases in the density of information recorded to optical disks will be accompanied by increasingly shorter focal lengths of the light beam for reading this high density information. When the focal length of the light beam is short, even minor vibrations in the focus direction, which heretofore could be ignored, come to have a significant impact on signal reproduction. Consequently, it is difficult to ensure sufficient vibration resistance properties in conventional optical disk devices that detect vibrations based on only the tracking error signal.

SUMMARY OF THE INVENTION

In light of the above problems, the present invention addresses the issue of increasing the vibration resistance of an optical disk device with respect to vibrations given from the outside, and in particular to vibrations in the focus direction. It is an object of the present invention to provide an optical disk device that is strong against vibrations in the focus direction and a semiconductor integrated circuit thereof, and it is a further object of the present invention to provide a method of controlling the pickup so as to achieve this vibration resistance and a method of detecting the vibration component.

As a means to solve the above problems, the present invention is an optical disk device in which a focus control and a tracking control of a pickup are performed, and is provided with an adder for adding a focus vibration component obtained from a focus error signal for the focus control and a tracking vibration component obtained from a tracking error signal for the tracking control, and an extraction means for extracting, from an output of the adder, a vibration component of a vibration acting on the optical disk device, wherein the focus control and the tracking control are performed based on the vibration component.

According to the present invention, the focus vibration component that is obtained from the focus error signal and the tracking vibration component that is obtained from the tracking error signal are added by the adder. From these added results, the vibration component of the vibration that is acting on the optical disk device is extracted by the extraction means. Then, based on this vibration component, the focus control and the tracking control of the pickup are performed. Thus, not only vibrations in the tracking direction but also vibrations in the focus direction are considered in the detection of vibrations that are imparted to the optical device, so that the vibration detection performance is improved and the vibration resistance of the device can be increased.

In the present invention, it is preferable that the optical disk device is further provided with a focus component generation portion for generating the focus vibration component from the focus error signal, and that the focus component generation portion has a multiplication means for multiplying the focus error signal by a predetermined multiplier coefficient. Thus, by multiplying the focus error signal by a predetermined multiplier coefficient, it is possible to add various weightings to vibrations in the focus direction when performing vibration detection.

Furthermore, it is preferable that the optical disk device is further provided with a focus control means for performing the focus control and a filter control means for changing the properties of a filter of the focus control means, and that when the focus control is not necessary, the filter control means changes the properties of the filter of the focus control means so that the focus control is not performed, and sets the predetermined multiplier coefficient in the multiplication means to zero. Consequently, when focus control of the pickup is not necessary, the filter control means changes the properties of the filter of the focus control means so that the focus control is not performed, and also sets the predetermined multiplier coefficient in the multiplication means of the focus component generation portion to zero so as to nullify the focus error signal. Thus, for example, when the focus servo of the pickup is applied, misdetection of vibrations based on the focus error signal can be prevented.

Further, in the present invention, it is preferable that the optical disk device is further provided with a tracking component generation portion for generating the tracking vibration component from the tracking error signal, and that the tracking component generation portion has a multiplication means for multiplying the tracking error signal by a predetermined multiplier coefficient. Thus, by multiplying the tracking error signal by a predetermined multiplier coefficient, it is possible to add various weightings to vibrations in the tracking direction when performing vibration detection.

Furthermore, it is preferable that the optical disk device is further provided with a tracking control means for performing the tracking control and a filter control means for changing the properties of a filter of the tracking control means, and that when the tracking control is not necessary, the filter control means changes the properties of the filter of the tracking control means so that the tracking control is not performed, and sets the predetermined multiplier coefficient in the multiplication means to zero. Consequently, when tracking control of the pickup is not necessary, the filter control means changes the properties of the filter of the tracking control means so that the tracking control is not performed, and also sets the predetermined multiplier coefficient in the multiplication means of the tracking component generation portion to zero so as to nullify the tracking error signal. Thus, the misdetection of vibrations based on the tracking error signal can be prevented during track access processing such as track searches, for example.

Also, it is further preferable that in the present invention, the optical disk device further includes a focus component generation portion for generating the focus vibration component from the focus error signal, wherein the focus component generation portion has a square calculation means for squaring a value indicated by the signal input thereto, and sets the focus vibration component to a value equal to or greater than zero and outputs it. In place of the square calculation means, the focus component generation portion can also have an absolute value calculation means for taking the absolute value of the value indicated by the signal input thereto.

It is also preferable that in the present invention, the optical disk device further includes a tracking component generation portion for generating the tracking vibration component from the tracking error signal, wherein the tracking component generation portion has a square calculation means for squaring a value indicated by the signal input thereto, and sets the tracking vibration component to a value equal to or greater than zero and outputs it. In place of the square calculation means, the tracking component generation portion can also have an absolute value calculation means for taking the absolute value of the value indicated by the signal input thereto.

When the focus vibration component and the tracking vibration component are opposite in phase and their levels are reversed between positive and negative, then if these components are simply added, their levels cancel each other out, and it becomes difficult to extract an accurate vibration component. Accordingly, by giving the focus vibration component and the tracking vibration component values that are equal to or greater than zero and then adding them, the vibration component can be extracted correctly.

Also, in the present invention, it is preferable that the extraction means is a low-pass filter. Thus, the extraction means of the present invention can be achieved through a simpler configuration.

Also, as a means to solve the above-mentioned problems, the present invention is a semiconductor integrated circuit, in an optical disk device, for performing a focus control and a tracking control of a pickup, and is provided with an adder for adding a focus vibration component obtained from a given focus error signal and a tracking vibration component obtained from a given tracking error signal, and with an extraction means for extracting, from an output of the adder, a vibration component of a vibration acting on the optical disk device, wherein the focus control and the tracking control are performed based on the vibration component.

As an additional means to solve the above-mentioned problems, the present invention is a pickup control method of performing a focus control and a tracking control of a pickup in an optical disk device, the method including a step of adding a focus vibration component obtained from a focus error signal and a tracking vibration component obtained from a tracking error signal, and a step of extracting, from the results of the adding step, a vibration component of a vibration acting on the optical disk device, wherein the focus control and the tracking control are performed based on the vibration component.

It is preferable that the pickup control method further includes a step of nullifying the focus vibration component in the adding step when the focus control is not necessary.

It is preferable that the pickup control method further includes a step of nullifying the tracking vibration component in the adding step when the tracking control is not necessary.

As an additional means to solve the above-mentioned problems, the present invention is a method of extracting a vibration component of a vibration that is acting on an optical disk device, wherein the vibration component is extracted based on a focus error signal and a tracking error signal.

BRIEF DESCRIPTION OF THE DRAWINGS

FIG. 1 is a diagram of the configuration of an optical disk device of Embodiment 1 of the present invention.

FIG. 2 is a diagram of the configuration of an optical disk device of Embodiment 2 of the present invention.

FIG. 3 is a diagram of the configuration of an optical disk device of Embodiment 3 of the present invention.

DETAILED DESCRIPTION OF THE INVENTION

Figure 4:
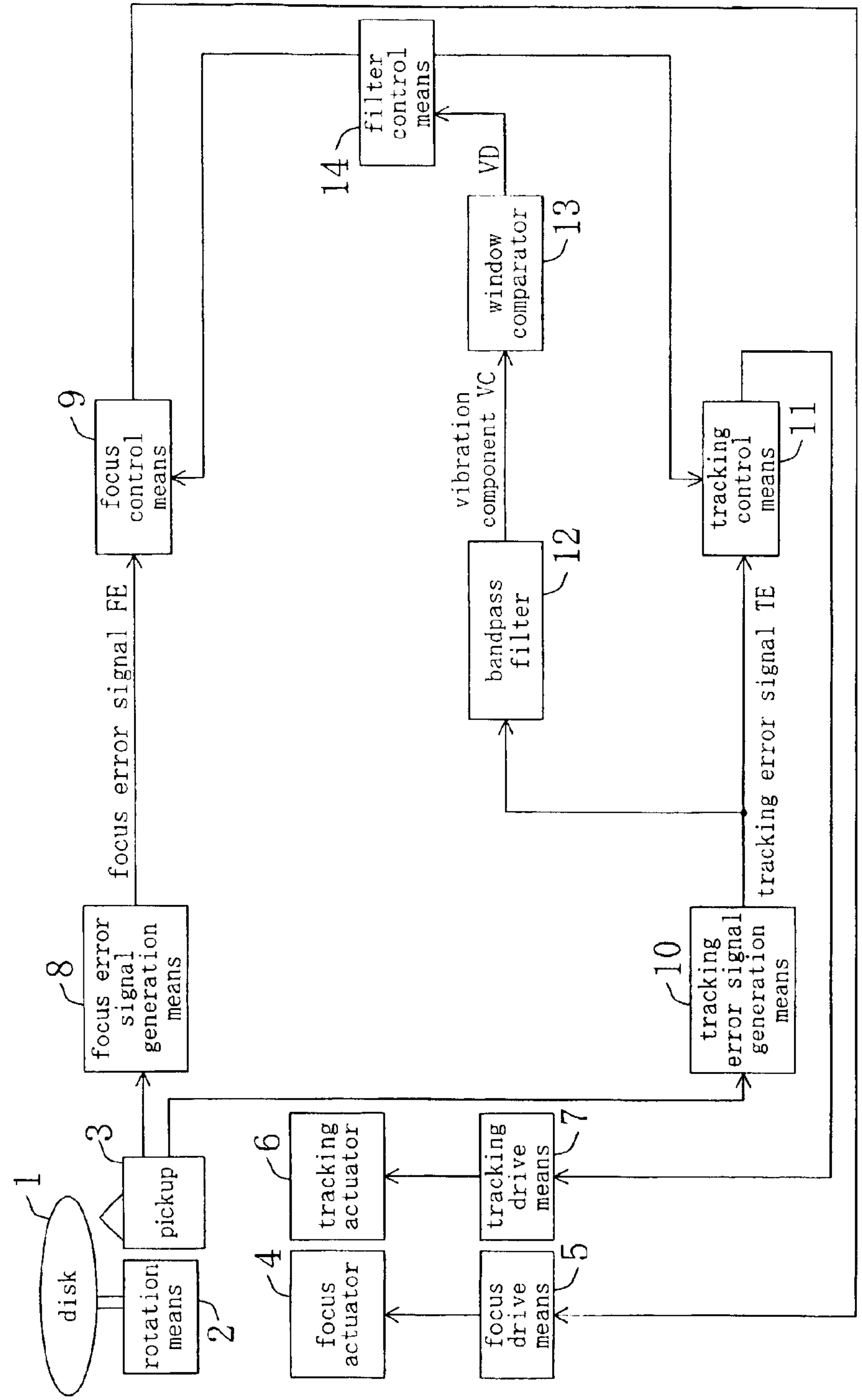
FIG. 4 is a diagram of the configuration of a conventional optical disk device.

Hereinafter, embodiments of the present invention are described in detail with reference to the drawings.

Embodiment 1

FIG. 1 shows the configuration of an optical disk device 100 according to Embodiment 1 of the present invention. The optical disk device 100 is described in detail below, however, structural elements that it shares with the optical disk device shown in FIG. 4 are assigned identical reference numerals and description thereof is omitted.

The optical disk device 100 is provided with a focus component generation portion 120 for generating the focus vibration component FC from a focus error signal FE, a tracking component generation portion 130 for generating the tracking vibration component TC from a tracking error signal TE, an adder 19 for adding the focus vibration component FC and the tracking vibration component TC, and a low-pass filter 12A (this corresponds to the extraction means of the present invention) for extracting the vibration component VC from the added results of the adder 19. The optical disk device 100 performs the focus control and the tracking control of the pickup 3 based on the vibration component VC.

It should be noted that the focus component generation portion 120, the tracking component generation portion 130, the adder 19, and the low-pass filter 12A are provided in a semiconductor integrated circuit 110, which substantially controls the focus and the tracking of the pickup 3.

The focus component generation portion 120 is constituted by a multiplication means 15, in which a predetermined multiplier coefficient has been set. The focus error signal FE is amplified or attenuated by the multiplication means 15 in proportion to the predetermined multiplier coefficient, and output as the focus vibration component FC.

Similarly, the tracking component generation portion 130 is constituted by a multiplication means 17, in which a predetermined multiplier coefficient has been set. The tracking error signal TE is amplified or attenuated by the multiplication means 17 in proportion to the predetermined multiplier coefficient, and output as the tracking vibration component TC.

It should be noted that "1" can be set as the predetermined multiplier coefficient of the multiplication means 15 and 17. If the multiplier coefficient is "1," then the focus vibration component FC and the tracking vibration component TC are substantially equal to the focus error signal FE and the tracking error signal TE, respectively.

The low-pass filter 12A is set to pass signal components that are below a particular frequency in order to obtain signals that are caused by vibrations. The low-pass filter 12A extracts signal components below a particular frequency from the added results of the adder 19 and outputs them as the vibration component VC.

The following description is of the operation of the optical disk device 100 configured as above when a vibration is acting on it from the outside.

First, focus error signal FE and tracking error signal TE are output from the focus error signal generation means 8 and the tracking error signal generation means 10, respectively. These signals FE and TE are substantially at a level of zero when a normal focus servo and a tracking servo are applied to the pickup 3. However, when a strong vibration, for example, acts on the optical disk device 100, the level of the signals is significantly altered in correspondence with the amount of vibration.

The multiplication means 15 multiplies the focus error signal FE by a predetermined multiplier coefficient and outputs the result as the focus vibration component FC. Similarly, the multiplication means 17 multiplies the tracking error signal TE by a predetermined multiplier coefficient and outputs the result as the tracking vibration component TC. The adder 19 adds the focus vibration component FC and the tracking vibration component TC and outputs the added results to the low-pass filter 12A. The low-pass filter 12A extracts signal components below a predetermined frequency from the added results that it has been given, and outputs the result as the vibration component VC. Thus, the vibration component VC that is extracted by the optical disk device 100 of this embodiment takes into consideration not only vibrations in the tracking direction but also vibrations in the focus direction.

The window comparator 13 outputs a vibration detection signal VD when a vibration has been detected based on the vibration component VC. A filter control means 14A receives the vibration detection signal VD and alters the properties of the filters that are respectively provided in the focus control means 9 and the tracking control means 11, so as to stabilize the focus servo and the tracking servo.

Incidentally, the tracking control of the pickup 3 must be turned off during track accesses, such as when tracks are searched. However, when the tracking control is turned off, the tracking error signal TE comes to include not only components that are caused by vibrations but also components that are related to the track being accessed. For this reason, the tracking error signal TE must be nullified in the vibration detection process described above.

When the tracking control of the pickup 3 is not necessary, the filter control means 14A changes the properties of the filter of the tracking control means 11 so that the tracking control is not performed, and also sets the predetermined multiplier coefficient in the multiplication means 17 to zero. Thus, the tracking error signal TE is masked and nullified, so that misdetection of vibrations can be prevented.

Also, when the focus servo is applied, it is necessary to turn off the focus control for the pickup 3. If the focus control is turned off, the focus error signal FE must be nullified for the same reason as above. When the focus control of the pickup 3 is not necessary, the filter control means 14A changes the properties of the filter of the focus control means 9 so that the focus control is not performed, and also sets the predetermined multiplier coefficient in the multiplication means 15 to zero. Thus, the focus error signal FE is masked and nullified, so that misdetection of vibrations can be prevented.

As set forth above, according to this embodiment, the vibration component VC is extracted based on the focus error signal FE and the tracking error signal TE, and based on this vibration component VC, vibrations are detected and the pickup 3 is controlled. Thus, both vibration detection performance and vibration resistance can be improved.

Furthermore, by providing the multiplication means 15 and 17, various weightings can be added to vibrations in the focus direction and in the tracking direction in order to variously change the detection sensitivity with respect to the focus vibration component FC and the tracking vibration component TC. Thus, if there is specificity in the vibration direction (for example, there is a large amount of up/down vibration, that is, vibration in the focus direction, with respect to the installation direction of the device, in the installation environment, and when the device is installed in an automobile), it is possible to perform vibration detection with directional specificity by appropriately setting the detection sensitivity of vibrations in the focus direction or in the tracking direction.

It should be noted that in this embodiment, the filter control means 14A sets the multiplier coefficient in the multiplication means 15 and 17 to zero in order to mask the focus error signal FE and the tracking error signal TE, however, it is also possible to adopt other methods to nullify the signals FE and TE. For example, a switch can be provided in the input portions of the multiplication means 15 and 17 in order to block the focus error signal FE and the tracking error signal TE and thereby nullify them.

Embodiment 2

In Embodiment 1, the multiplied focus error signal FE and tracking error signal TE are added as they are when received. However, when compound vibrations are generated in the focus or tracking directions, the phase of the focus error signal FE and the tracking error signal TE may become opposite to one another and their level reversed between positive and negative. In this case, the vibration components cancel each other out if the focus error signal FE and the tracking error signal TE are merely added, and there is a risk that accurate vibration detection is not possible.

An optical disk device of Embodiment 2 of the present invention has been configured so that it extracts an accurate vibration component and accurately performs vibration detection even if a compound vibration such as that mentioned above is generated. FIG. 2 shows the configuration of an optical disk device 100A according to Embodiment 2 of the present invention. The optical disk device 100A is described in detail below, however, structural elements that it shares with the optical disk devices shown in FIGS. 1 and 4 are assigned identical reference numerals and a description thereof is omitted.

A focus component generation portion 120A in the optical disk device 100A is made of the multiplication means 15 and a square calculation means 16. Similarly, a tracking component generation portion 130A is made of the multiplication means 17 and a square calculation means 18. Both the focus component generation portion 120A and the tracking component generation portion 130A are provided in a semiconductor integrated circuit 110A.

The square calculation means 16 inputs the multiplied focus error signal FE that is output from the calculation means 15, squares the value indicated by this signal FE (a positive or negative level, when referenced against the zero level of the focus error signal FE), and outputs the result as the focus vibration component FC. Thus, the value that is indicated by the focus vibration component FC is equal to or greater than zero.

The square calculation means 18 inputs the multiplied tracking error signal TE that is output from the calculation means 17, squares the value indicated by this signal TE (a positive or negative level, when referenced against the zero level of the tracking error signal TE), and outputs the result as the tracking vibration component TC. Thus, the value that is indicated by the tracking vibration component TC is equal to or greater than zero.

As set forth above, according to this embodiment, by incorporating the square calculation means 16 and 18 in the generation of the vibration components of the focus and tracking systems, the focus vibration component FC and the tracking vibration component TC can both be given a value equal to or greater than zero. Consequently, a correct vibration component VC can be extracted without the focus vibration component FC and the tracking vibration component TC canceling each other out. Thus, vibrations can be more accurately detected, even if compound vibrations are generated in the focus direction and the tracking direction.

Also, if the vibration component VC is viewed as the vector amount that is made of the vibration components in the focus direction and the tracking direction, then squaring and adding the vibration components in the focus and tracking directions is equivalent to calculating the size of the vector of the vibration component VC. Consequently, this embodiment enables the extraction of a more preferable vibration component VC.

It should be noted that in this embodiment, in both the focus and the tracking systems, the squaring calculation is performed after multiplication is performed, however, it is also possible to reverse this order.

Embodiment 3

An optical disk device according to Embodiment 3 of the present invention is capable of handling a case where compound vibrations are generated, using a different configuration than the optical disk device according to Embodiment 2.

FIG. 3 shows the configuration of an optical disk device 100B of Embodiment 3 of the present invention. The optical disk device 100B is described in detail below, however, structural elements that it shares with the optical disk devices shown in FIGS. 1 and 4 are assigned identical reference numerals and a description thereof is omitted.

A focus component generation portion 120B in the optical disk device 100B is configured by the multiplication means 15 and an absolute value calculation means 20. Similarly, a tracking component generation portion 130B is configured by the multiplication means 17 and an absolute value calculation means 21. Both the focus component generation portion 120B and the tracking component generation portion 130B are provided in a semiconductor integrated circuit 110B.

The absolute value calculation means 20 inputs the multiplied focus error signal FE that is output from the calculation means 15, takes the absolute value of the value indicated by this signal FE (a positive or negative level, when referenced against the zero level of the focus error signal FE), and outputs the result as the focus vibration component FC. Thus, the value shown by the focus vibration component FC is equal to or greater than zero.

The absolute value calculation means 21 inputs the multiplied tracking error signal TE that is output from the calculation means 17, takes the absolute value of the value indicated by this signal TE (a positive or negative level, when referenced against the zero level of the tracking error signal TE), and outputs the result as the tracking vibration component TC. Thus, the value shown by the tracking vibration component TC is equal to or greater than zero.

As set forth above, according to this embodiment, by incorporating the absolute value calculation means 20 and 21 in the generation of the vibration components of the focus and tracking systems, the focus vibration component FC and the tracking vibration component TC can both be set a value equal to or greater than zero. Consequently, a correct vibration component VC can be extracted without the focus vibration component FC and the tracking vibration component TC canceling each other out. Thus, vibrations can be more accurately detected, even if compound vibrations are generated in the focus direction and in the tracking direction.

It should be noted that in this embodiment, in both the focus and the tracking systems, the absolute value calculation is performed after multiplication is performed, however, it is also possible to reverse this order.

Under the objective of setting the focus vibration component FC and the tracking vibration component TC both to a value that is equal to or greater than zero, in addition to Embodiments 2 and 3 mentioned above, an embodiment combining the square calculation means and the absolute value calculation means is also possible.

In Embodiments 1 to 3, two multiplication means 15 and 17 were provided to allow the detection sensitivity of the focus error signal FE and the tracking error signal TE to be changed, however, it is not absolutely necessary that there are two multiplication means. Providing a multiplication means in either the focus system or the tracking system makes it possible to create a difference in the detection sensitivity for the focus error signal FE and the tracking error signal TE, and the same effects as mentioned above can be achieved. Providing a single multiplication means has the effect that the configuration of the optical disk device and the semiconductor integrated circuit can be simplified. Furthermore, it is also possible to not provide any multiplication means and to directly input the focus error signal FE and the tracking error signal TE into the adder 19.

Also, in Embodiments 1 to 3, the low-pass filter 12A was provided as the extraction means of the present invention, but it is also possible to use the bandpass filter 12 shown in FIG. 4 as in the conventional example. However, it is preferable that the low-pass filter 12A is used as the extraction means when, in bands where there is little steady-state error of the servo and that are below the frequency of the vibration, it is permissible to ignore the focus error signal FE and the tracking error signal TE that are due to steady-state errors of the servo. Thus, the optical disk device and the semiconductor integrated circuit can be given a simpler configuration.

As described above, according to the present invention, consideration is given to not only vibrations in the tracking direction but also vibrations in the focus direction during the detection of vibrations acting on the optical disk device. Consequently, vibrations can be more accurately detected and an optical disk device with greater vibration resistance can be achieved.

Additionally, it is expected that future increases in the density of information recorded to optical disks will be accompanied by a need for even more stringent vibration resistance in optical disks devices for reading this high density information than before. The present invention can be effectively applied to not only optical disk devices that are employed under severe conditions where there is much vibration, but also to future optical disk devices for reading the high density information.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disk device in which a focus control and a tracking control of a pickup are performed, comprising:

an adder for adding a focus vibration component obtained from a focus error signal for the focus control and a tracking vibration component obtained from a tracking error signal for the tracking control; and an extraction means for extracting, from an output of the adder, a vibration component of a vibration acting on the optical disk device;

wherein the focus control and the tracking control are performed based on the vibration component.

2. The optical disk device according to claim 1, further comprising a focus component generation portion for generating the focus vibration component from the focus error signal;

wherein the focus component generation portion has a multiplication means for multiplying the focus error signal by a predetermined multiplier coefficient.

3. The optical disk device according to claim 2, further comprising:

a focus control means for performing the focus control; and a filter control means for changing the properties of a filter of the focus control means;

wherein when the focus control is not necessary, the filter control means changes the properties of the filter of the focus control means so that the focus control is not performed, and sets the predetermined multiplier coefficient in the multiplication means to zero.

4. The optical disk device according to claim 1, further comprising a tracking component generation portion for generating the tracking vibration component from the tracking error signal;

wherein the tracking component generation portion has a multiplication means for multiplying the tracking error signal by a predetermined multiplier coefficient.

5. The optical disk device according to claim 4, further comprising:

a tracking control means for performing the tracking control; and a filter control means for changing the properties of a filter of the tracking control means;

wherein when the tracking control is not necessary, the filter control means changes the properties of the filter of the tracking control means so that the tracking control is not performed, and sets the predetermined multiplier coefficient in the multiplication means to zero.

6. The optical disk device according to claim 1, further comprising a focus component generation portion for generating the focus vibration component from the focus error signal;

wherein the focus component generation portion has a square calculation means for squaring a value indicated by the signal input thereto, and sets the focus vibration component to a value equal to or greater than zero and outputs it.

7. The optical disk device according to claim 1, further comprising a tracking component generation portion for generating the tracking vibration component from the tracking error signal;

wherein the tracking component generation portion has a square calculation means for squaring a value indicated by the signal input thereto, and sets the tracking vibration component to a value equal to or greater than zero and outputs it.

8. The optical disk device according to claim 1, further comprising a focus component generation portion for generating the focus vibration component from the focus error signal;

wherein the focus component generation portion has an absolute value calculation means for taking the absolute value of a value indicated by the signal input thereto, and sets the focus vibration component to a value equal to or greater than zero and outputs it.

9. The optical disk device according to claim 1, further comprising a tracking component generation portion for generating the tracking vibration component from the tracking error signal;

wherein the tracking component generation portion has an absolute value calculation means for taking the absolute value of a value indicated by the signal input thereto, and sets the tracking vibration component to a value equal to or greater than zero and outputs it.

10. The optical disk device according to claim 1, wherein the extraction means is a low-pass filter.

11. A semiconductor integrated circuit for performing a focus control and a tracking control of a pickup in an optical disk device, comprising:

an adder for adding a focus vibration component obtained from a given focus error signal and a tracking vibration component obtained from a given tracking error signal; and an extraction means for extracting, from an output of the adder, a vibration component of a vibration acting on the optical disk device;

wherein the focus control and the tracking control are performed based on the vibration component.

12. A pickup control method of performing a focus control and a tracking control of a pickup in an optical disk device, comprising the steps of:

adding a focus vibration component obtained from a focus error signal and a tracking vibration component obtained from a tracking error signal; and extracting, from the results of the adding step, a vibration component of a vibration acting on the optical disk device;

wherein the focus control and the tracking control are performed based on the vibration component.

13. The pickup control method according to claim 12, further comprising:

a step of nullifying the focus vibration component in the adding step when the focus control is not necessary.

14. The pickup control method according to claim 12, further comprising:

a step of nullifying the tracking vibration component in the adding step when the tracking control is not necessary.

* * * * *